US009807088B2

(12) United States Patent
Mestanov et al.

(10) Patent No.: US 9,807,088 B2
(45) Date of Patent: Oct. 31, 2017

(54) METHOD AND NETWORK NODE FOR OBTAINING A PERMANENT IDENTITY OF AN AUTHENTICATING WIRELESS DEVICE

(71) Applicant: Telefonaktiebolaget L M Ericsson (publ), Stockholm (SE)

(72) Inventors: Filip Mestanov, Sollentuna (SE); Icaro L. J. Da Silva, Bromma (SE); Yu Wang, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 315 days.

(21) Appl. No.: 14/767,497

(22) PCT Filed: Jul. 29, 2013

(86) PCT No.: PCT/SE2013/050937
§ 371 (c)(1),
(2) Date: Aug. 12, 2015

(87) PCT Pub. No.: WO2014/126518
PCT Pub. Date: Aug. 21, 2014

(65) Prior Publication Data
US 2015/0381611 A1 Dec. 31, 2015

Related U.S. Application Data

(60) Provisional application No. 61/764,229, filed on Feb. 13, 2013.

(51) Int. Cl.
*H04L 29/06* (2006.01)
*H04W 12/06* (2009.01)
(Continued)

(52) U.S. Cl.
CPC ......... *H04L 63/0853* (2013.01); *H04W 12/06* (2013.01); *H04W 92/02* (2013.01);
(Continued)

(58) Field of Classification Search
CPC .. H04L 63/0853; H04L 63/162; H04W 12/06; H04W 92/02; H04W 88/06; H04W 84/12
See application file for complete search history.

(56) References Cited

U.S. PATENT DOCUMENTS

2008/0026724 A1    1/2008  Zhang
2012/0276874 A1*  11/2012  Huang ................. H04L 63/102
                                                    455/411
(Continued)

FOREIGN PATENT DOCUMENTS

EP         2 023 564 A1    2/2009
WO    WO 2005/109818 A1  11/2005

OTHER PUBLICATIONS

International Search Report, Application No. PCT/SE2013/050937, dated May 6, 2014.
(Continued)

*Primary Examiner* — Anthony Brown
*Assistant Examiner* — William Corum, Jr.
(74) *Attorney, Agent, or Firm* — Sage Patent Group

(57) ABSTRACT

A network node, such as a Wi-Fi Access Point/Authenticator, is able to obtain a permanent device identity of a wireless device requesting authentication, in case the wireless device has only provided an alias. This is achieved by the network node intercepting an authentication message from the wireless device, wherein the authentication message includes a signaled identity of the wireless device, and extracts the signaled identity. In case the extracted identity is an alias and not a permanent identity of the wireless device, the network node responsively manipulates at least one further authentication message to cause the wireless device to signal its permanent identity in a subsequent authentication message.

30 Claims, 9 Drawing Sheets

(51) Int. Cl.
*H04W 92/02* (2009.01)
*H04W 84/12* (2009.01)
*H04W 88/06* (2009.01)

(52) U.S. Cl.
CPC .......... *H04L 63/162* (2013.01); *H04W 84/12* (2013.01); *H04W 88/06* (2013.01)

(56) References Cited

U.S. PATENT DOCUMENTS

| 2014/0050320 | A1* | 2/2014 | Choyi | H04L 63/08 380/270 |
| 2015/0341845 | A1* | 11/2015 | Hedberg | H04W 12/08 370/329 |
| 2016/0249217 | A1* | 8/2016 | Luft | G06Q 30/0205 |

OTHER PUBLICATIONS

Written Opinion of the International Searching Authority, Application No. PCT/SE2013/050937, dated May 6, 2014.
3GPP, Technical Specification, "3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 11)", 3GPP TS 24.234 V11.1.0 (Dec. 2011), 41 pp.
Aboba et al., "Extensible Authentication Protocol (EAP) Key Management Framework", Network Working Group, Request for Comments: 5247 (Updates: 3748), Category: Standards Track, Aug. 2008, 79 pp.
Aboba et al., "Extensible Authentication Protocol (EAP)", Network Working Group, Request for Comments: 3748 (Updates: 2284), Category: Standards Track, Jun. 2004, 67 pp.
Aboba et al., "RADIUS (Remote Authentication Dial in User Service) Support for Extensible Authentication Protocol (EAP)", Network Working Group, Request for Comments: 3579 (Updates: 2869), Category: Informational, Sep. 2003, 46 pp.
Arkko et al., "Extensible Authentication Protocol Method for $3^{rd}$ Generation Authentication and Key Agreement (EAP-AKA)", Network Working Group, Request for Comments: 4187, Category: Informational, © The Internet Society, Jan. 2006, 79 pp.
Arkko et al., "Improved Extensible Authentication Protocol Method for $3^{rd}$ Generation Authentication and Key Agreement (EAP-AKA')", Network Working Group, Request for Comments: 5448 (Updates: 4187), Category: Informational, May 2009, 29 pp.
Ericsson AB, "Heterogeneous Networks", *Ericsson White Paper*, Uen 284 23-3165 Rev B, Sep. 2014, 12 pp.
Haverinen et al., Extensible Authentication Protocol Method for Global System for Mobile Communications (GSM) Subscriber Identity Modules (EAP-SIM), Network Working Group, Request for Comments: 4186, Category: Informational, Jan. 2006, 92 pp.
Communication with Supplementary European Search Report, EP Application No. 13875194.6, dated Feb. 3, 2016.
Ericsson, "WLAN—Certificate-Based Protection of IMSI for EAP-SIM/AKA", Agenda Item: WLAN, Document for: Discussion and decision, 3GPP TSG SA WG3 Security #27, S3-030081, Sophia-Antipolis, France, Feb. 25-28, 2003, 4 pp.

\* cited by examiner

METHOD AND NETWORK NODE FOR OBTAINING A PERMANENT IDENTITY OF AN AUTHENTICATING WIRELESS DEVICE

CROSS REFERENCE TO RELATED APPLICATIONS

This application is a 35 U.S.C. §371 national stage application of PCT International Application No. PCT/SE2013/050937, filed on Jul. 29 2013, which itself claims priority to U.S. provisional Application No. 61/764,229, filed Feb. 13, 2013, the disclosure and content of both of which are incorporated by reference herein in their entirety. The above-referenced PCT International Application was published in the English language as International Publication No. WO 2014/126518 A1 on Aug. 21, 2014.

TECHNICAL FIELD

The invention relates to a method in a network node for obtaining a permanent device identity of a wireless device requesting authentication, and to a network node for performing the method.

BACKGROUND

In a 3GPP system, a wireless device is allowed to attach to and access a wireless communication network, if the wireless device is associated with a subscription that allows the wireless communication network to authenticate the wireless device. The 3rd Generation Partnership Project, 3GPP, wireless local area network, WLAN, interworking specifies network access authentication based on the Extensible Authentication Protocol, EAP. The EAP authentication framework provides support for different authentication methods. The protocol is carried directly over data-link layer (DDL) and is currently widely deployed especially in wired and wireless local area networks. The EAP-SIM (Subscriber Identity Module) is a method for authentication and session key distribution using the GSM SIM, and the EAP-AKA is a method similar to the EAP-SIM, with the difference that that it uses the Authentication and Key Agreement, AKA, mechanism. EAP-AKA', also denoted EAP-AKA Prime, is a revision of the EAP-AKA method, and uses a new key derivation function that binds the derived keys to the name of the access network.

EAP-SIM, EAP-AKA and EAP-AKA' share the same framework and hence have very similar signaling flows. In EAP terminology there are three main entities that participate in the authentication:

- A Supplicant—the entity that requests the authentication. In the following, the term wireless device will be used synonymously for the supplicant.
- An Authenticator—the front-end entity that communicates with an Authentication Server (as described below), normally using an authentication server protocol such as e.g. the RADIUS protocol or the DIAMETER protocol, and relays messages between the Supplicant and the Authentication server. However, other protocols than the RADIUS protocol and the DIAMETER protocol are within the scope of the following disclosure. Further, in the following disclosure, the authenticator will also be described as a network node.
- The Authentication Server—the back-end entity that is responsible for carrying the authentication and key derivation, based on the Supplicant's network secret.

Wi-Fi is considered a key candidate for small cell solutions for mobile broadband heterogeneous networks. Consequently, Wi-Fi integration to the 3GPP Radio Access Network, RAN, is emerging as an interesting study object. In order for operators to benefit from the full advantages offered by the Wi-Fi integration into the 3GPP RAN, the operators need greater control over the access selection of their subscribers compared to the current implementations, where the decision is purely device-based. Integration may involve combining both 3GPP and Wi-Fi in the small pico-base stations in order to gain access to the Wi-Fi sites with 3GPP technology and vice versa. A second level of integration that may be implemented involves integrating the Wi-Fi access tighter into the RAN by introducing enhanced network controlled traffic steering between 3GPP and Wi-Fi, based on knowledge about the combined situation in the different accesses. An object for this second level of integration is to avoid potential issues with device-controlled Wi-Fi selection, such as selecting Wi-Fi when the Wi-Fi connection is bad or when the wireless device is moving, thus giving better end user performance and better utilization of the combined Wi-Fi and cellular radio network resources.

In order to achieve good support for network-controlled Wi-Fi/3GPP access selection and service mapping, it is required to link (or connect) the wireless device context in the 3GPP RAN, which holds information e.g. about the radio performance and the device mobility on the 3GPP side, with the device context in the Wi-Fi network. This could then enable a network entity/node to take decisions whether the wireless device should access the Wi-Fi network or not depending e.g. on if the wireless device is stationary and/or has a good connection to the Wi-Fi AP (Wi-Fi Access Point). The decision may be signaled to the wireless device or executed internally in the 3GPP/Wi-Fi network, e.g. to control UE admission to the Wi-Fi network.

Different solutions have been proposed to enhance network controlled Wi-Fi/3GPP access selection. In one of the solutions, a logical entity on the network side collects information from both 3GPP and Wi-Fi systems before the access selection can be performed on a per-user basis.

In order to work properly, the logical entity must be able to correlate the information collected from both systems in order to make an access selection decision. This means that the logical entity needs to be able to identify each specific wireless device in both the Wi-Fi and 3GPP networks using proper identifiers in both networks.

This requirement can be fulfilled by probing the EAP messages, which contain the permanent identity of the wireless device. This identity contains the International Mobile Subscriber Identity (IMSI)—a 3GPP identifier unique for every wireless device. The IMSI is used during the EAP authentication and is sent by a wireless device, via a network node being the Wi-Fi access point, Wi-Fi AP, and corresponding to the Authenticator according to the EAP terminology. The network node may intercept and extract the IMSI during the EAP signaling. The network node is also aware of the Medium Access Control (MAC) address of the wireless device, which serves as a wireless device identifier in the Wi-Fi network. A mapping between the IMSI and the MAC enables the logical entity to trace the same wireless device in the two systems independently and is a key requirement for enabling network-based access selection.

Within the authentication framework of the EAP-SIM, the EAP-AKA and the EAP-AKA Prime, the Supplicant (in this case the wireless device) may be provided by the Authentication Server with a pseudonym and/or fast re-authentication identities with the intention that the wireless device uses those instead of its permanent identity. This is mainly due to security reasons. However, if the wireless device uses a pseudonym and/or fast re-authentication identity instead of its permanent identity, the aforementioned identity mapping, and the subsequent information correlation between the two systems, may be unsuccessful.

An important aspect of Wi-Fi integration into 3GPP networks is the need of a common performance monitoring (PM) system where operators are able to monitor the performance of each subscriber in both systems, e.g. for customer care purposes. In that case, the system must be able to perform a MAC/IMSI mapping for PM data correlation on per-subscriber basis. This may, however, be very cumbersome in case a pseudonym or fast re-authentication identity is used instead of the permanent identity, which contains the IMSI.

Hence, as explained above, a problem with the existing framework is related to a situation when the network node requires the permanent identity of the wireless device for different purposes, but the wireless device uses a pseudonym and/or fast re-authentication identity instead. For example, in the case of access network selection, the permanent identity may be required as an identifier used to find user-specific information from the 3GPP network. However, currently no method exists for obtaining the permanent identity of the wireless device at the network node in an authentication process, when a pseudonym is used by the wireless device, or for a fast re-authentication procedure, when the wireless device uses a fast re-authentication identity instead of its permanent identity.

SUMMARY

The object of embodiments of the present invention according to this disclosure is to address at least some of the problems outlined above, and this object and others are achieved by the method and the arrangement according to the appended independent claims, and by the embodiments according to the dependent claims.

A first aspect of the embodiments provides a method in a network node for obtaining a permanent device identity of a wireless device requesting authentication at said network node. An authentication message comprising a signaled identity of the wireless device requesting authentication is intercepted by the network node, and the signaled identity is extracted from the authentication message, whereupon a determination is made whether the signaled identity is an alias or not. When the device identity is an alias, at least one further authentication message is manipulated to cause signaling of a permanent device identity in a subsequent authentication message.

The permanent device identity may be retrieved from the subsequent authentication message, which may be an Extensible Authentication Protocol, EAP, response message from the wireless device.

The determination if the device identity is an alias may comprise checking a format of the signaled identity, and the alias may represent a pseudonym identity provided by a back-end authentication server or a fast re-authentication identity provided by the authentication server.

Furthermore, the permanent device identity may comprise an International Mobile Subscriber Identity, IMSI.

In accordance with a first embodiment, the manipulation of at least one further authentication message comprises the network node replacing the alias with a dummy identity in the intercepted authentication message, thereby providing an amended authentication message. The amended authentication message is forwarded to an authentication server.

An advantage of the first embodiment is that it constitutes a method that can be implemented with minimum efforts and without affecting the standardized framework.

In accordance with a second embodiment, the manipulation of at least one further authentication message comprises the network node including an attribute in the further authentication message requesting the wireless device to submit a permanent device identity in a subsequent authentication message.

An advantage of the second embodiment is, similar to the first, that it constitutes a method that can be implemented with minimum efforts and provides an alternative to the first embodiment.

In accordance with a third embodiment, the manipulation of at least one further authentication message comprises the network node inserting a request for a permanent device identity in the intercepted authentication message, thereby providing an amended authentication message. The amended authentication message is forwarded to an authentication server. A request is received from the authentication server to inquire the wireless device for the permanent device identity, whereupon the network node sends a request for the permanent device identity to the wireless device.

An advantage with the third embodiment is that it constitutes a robust solution, where the behavior of the Authentication Server and Supplicant are predictable since they follow a standardized framework.

A second aspect of the embodiments provides a network node for implementing disclosed method embodiments. The network node may be a Wi-Fi Access Point, and may correspond to an Authenticator according to the EAP terminology.

An advantage with the embodiments is to enable a network node, e.g. an Authenticator, to obtain the permanent identity of a wireless device, when the network node only receives an alias, e.g. a pseudonym or a fast re-authentication identity from the wireless device during an authentication procedure.

BRIEF DESCRIPTION OF THE DRAWINGS

The embodiments will now be described in more detail, and with reference to the accompanying drawings, in which.

DETAILED DESCRIPTION

In the following, embodiments of the invention will be described in more detail, with reference to accompanying drawings. For the purpose of explanation and not limitation, specific details are disclosed, such as particular scenarios and techniques, in order to provide a thorough understanding.

The various steps described below in connection with the figures should be primarily understood in a logical sense, while each step may involve the communication of one or more specific messages depending on the implementation and protocols used. Embodiments of the present disclosure relate, in general, to the field of EAP authentications using the EAP-SIM, EAP-AKA or EAP-AKA' authentication frameworks. However, it must be understood that the same principle may be applicable in other authentication schemes having similar signaling flows.

In this disclosure, the term wireless device is generally used. A wireless device, or user equipment, UE, which is the term used in the 3GPP specifications, may refer to any wireless device capable of communicating with a wireless network. Examples of such wireless devices are mobile phones, Smartphones, laptops, and Machine to Machine, M2M, devices.

Figure 1:
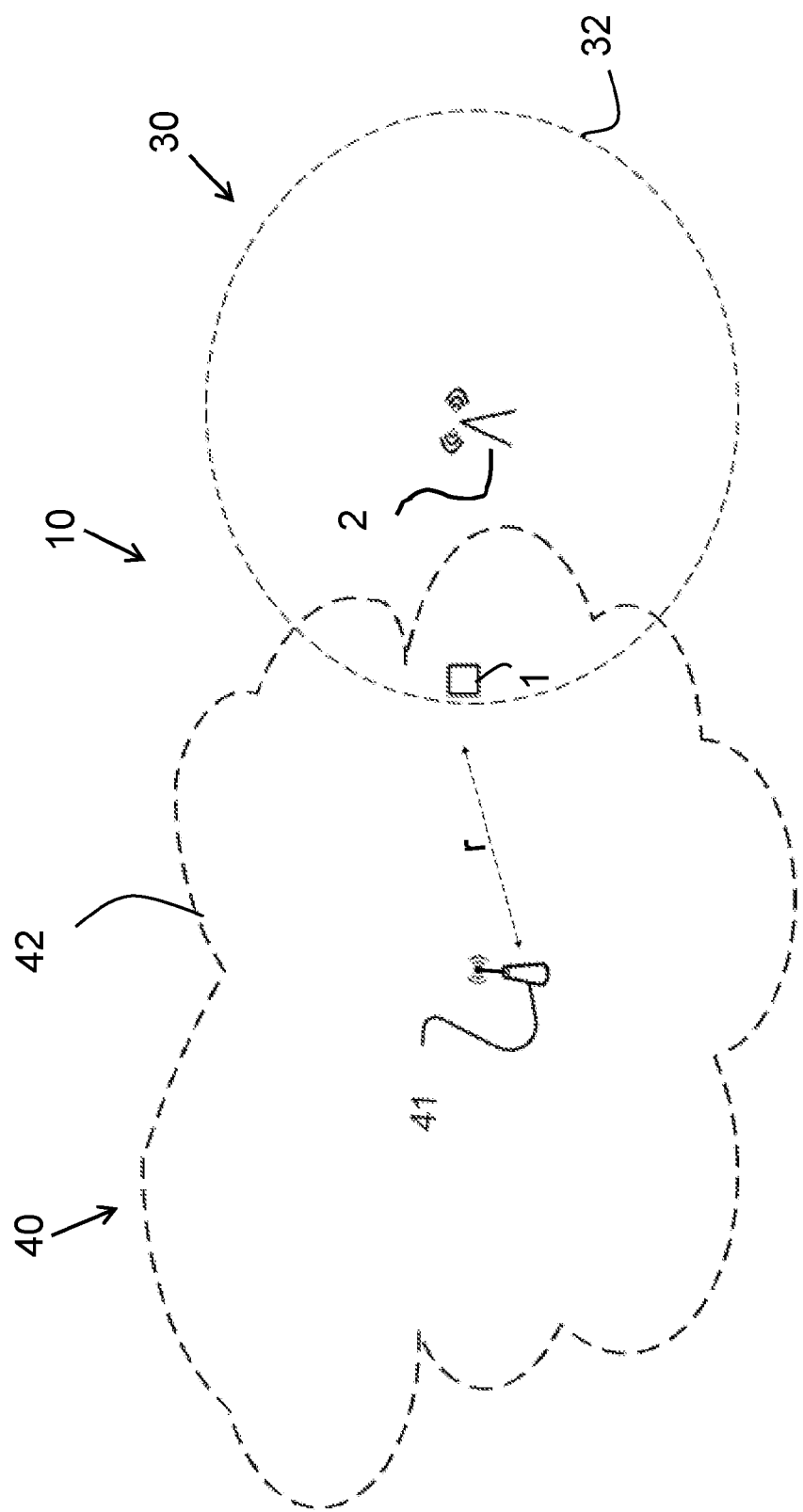
FIG. 1 schematically illustrates a mobile communication network.

FIG. 1 schematically illustrates a mobile communication network 10. The network 10 comprises a wireless device 1, a cellular network 40 and a wireless local area network 30, e.g. a Wi-Fi. In the illustrated example, the wireless device 1 is connected to the cellular network 40 via a base station 41, and the wireless device 10 is positioned within the cell 42 defined by the base station 41. The wireless device 1 is also within the range r of the wireless local area network 30, e.g. a Wi-Fi network having a Wi-Fi Access Point 2, which hereinafter may be referred to as a network node. The access selection of the wireless device is a network decision, and the permanent identity of the wireless device has be used in order to achieve good support for network-controlled Wi-Fi/3GPP access selection and service mapping. The wireless device context in the 3GPP RAN, which holds information about radio performance, device mobility etc. on the 3GPP side, must be linked to the device context in the Wi-Fi network, which requires a mapping of device identities based on a permanent device identity.

Figure 2A:
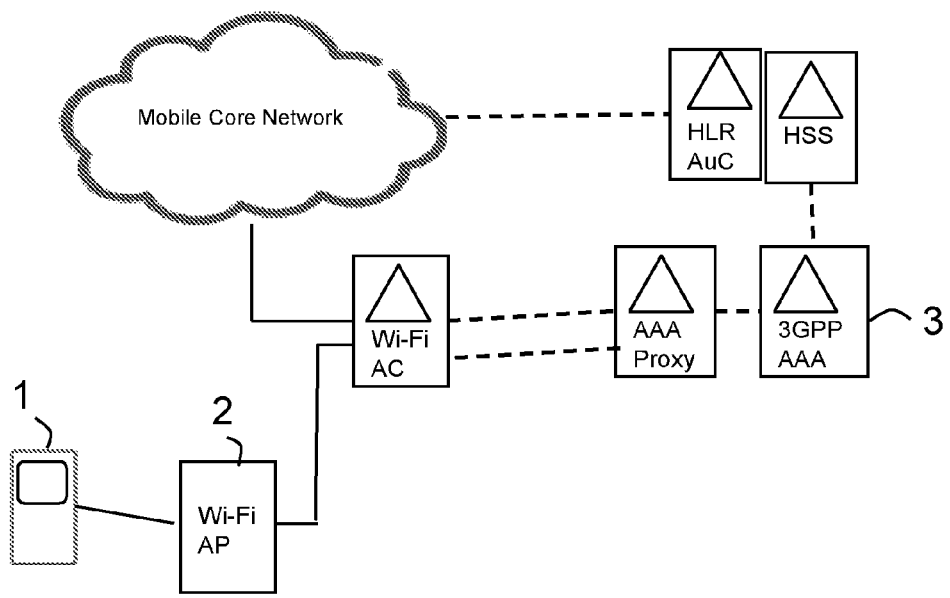
FIG. 2a schematically illustrates an example of system architecture for EAP authentication.

FIG. 2a schematically illustrates an example of a system architecture for EAP authentication including a wireless device 1, a network node (a Wi-Fi AP) 2 providing the access point for the wireless device, and an authentication server 3. (The dashed line in the figure indicates Control Plane only, and the continuous line indicates both Control Plane and User Plane, or only User Plane.)

Figure 2B:
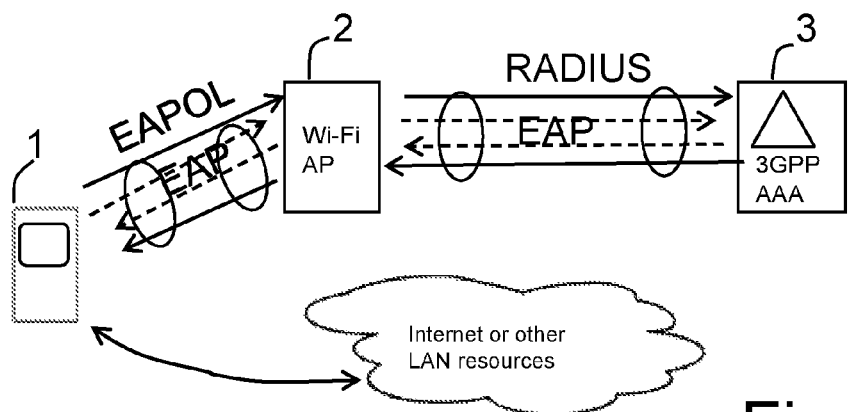
FIG. 2b schematically illustrates an example of EAP authentication architecture.

FIG. 2b shows an example of a simplified architecture and protocol organization for an EAP authentication procedure. Within the framework of EAP, the wireless device 1 that requests authentication is called Supplicant, the Wi-Fi AP 2 is called Authenticator, of which the main role is to forward the EAP messages to a backend Authentication Server 3—in this case the AAA server. The backend authentication server is responsible for performing the authentication and key derivation based on the Supplicant's network secret. It may be part of the 3GPP network (the usual case) or an autonomous AAA server, which has been provided with the network secret of the Supplicant. The EAP traffic between the wireless device 1 and the Wi-Fi Access Point 2 is encapsulated in EAP over LAN (EAPOL) frames, and in RADIUS frames or DIAMETER frames between the Access Point 2 and the AAA server 3. However, hereinafter the term wireless device will be used for the supplicant and the term network node for the authenticator/access point. (The dashed line in the FIG. 2b represents an EAP tunnel encapsulated within ether an EAPoL or RADIUS protocol)

Please note that even though this document generally refers to EAP-SIM as the described authentication procedure, all embodiments can be applied equally to EAP-AKA and EAP-AKA Prime or any other authentication framework which follows similar principles.

Figure 3:
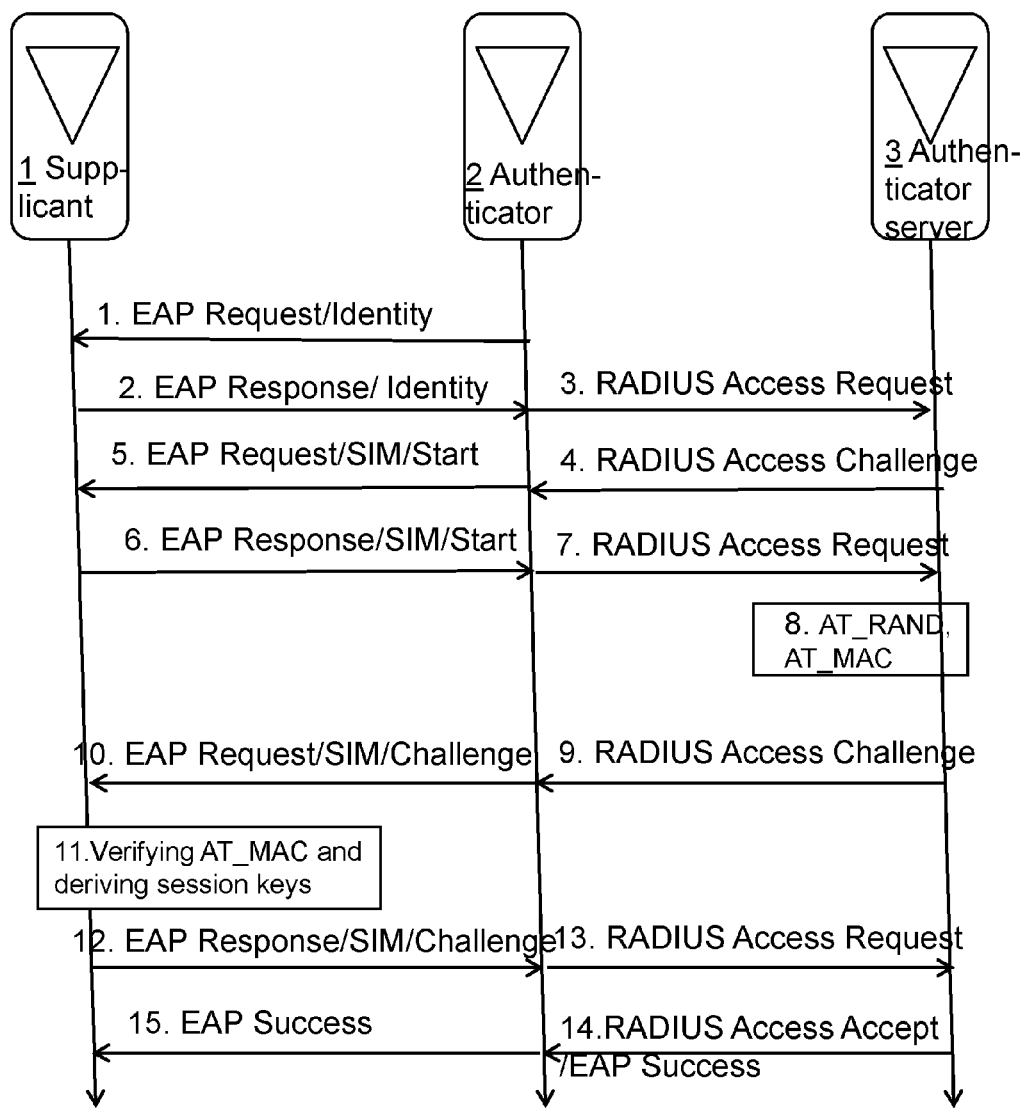
FIG. 3 is a signaling diagram illustrating a conventional EAP-SIM signaling procedure.

FIG. 3 is a signaling diagram disclosing an exemplary conventional EAP-SIM signaling procedure between a Supplicant/wireless device 1, an Authenticator/network node 2, and an Authentication server 3. In the first step 1 of the EAP-SIM authentication the Authenticator 2 sends an EAP-Request asking the Supplicant 1 to report its identity. The identity consists of a username portion, followed by the "@" symbol and a realm portion, and the username may be of any of the following three different types of usernames:

a)—A permanent username (usually the International Subscriber Identity Module—IMSI);
b)—A pseudonym username (provided by the Authentication Server);
c)—A fast re-authentication username (provided by the Authentication Server).

In step 2, the Supplicant 1 responds with its identity, e.g. "1234580123000100@wlan.mnc048.mcc264.3gppnetwork.org"; In step 3, the Authenticator 2 encapsulates the EAP-Response message in a RADIUS message (or, alternatively, in a DIAMETER message), and forwards it to Authentication Server 3. The Authentication Server 3 recognizes the EAP method and sends a RADIUS Access challenge/EAP-Request/SIM/Start, in step 4, indicating that an EAP-SIM procedure has been initiated for that Supplicant. It also includes the list of supported SIM versions in the message. The Authenticator 2 then relays the EAP-Request/SIM/Start message to the Supplicant 1, in step 5, and the Supplicant responds with EAP-Response/SIM/Start message, in step 6, which carries information about the supplicant's nonce (a randomly selected number), as well as the selected SIM version (AT_SELECTED_VERSION). In step 7, the Authenticator forwards a RADIUS Access Request/EAP-Response/SIM/Start to the Authentication Server.

In step 8, the Authentication Server 8 obtains the GSM triplet (RAND, SRES and Kc) and derives the keying material. The GSM triplet consists of the following:

RAND—a 128-bit random number, generated by the Authentication Center (an entity within the GSM core network, used to authenticate subscribers at the point of initial attach) when a subscriber authentication is requested. Its main use is for the derivation of the Signed Response (SRES) and the Kc;
SRES—a 32-bit variable, used to challenge the mobile station (i.e., the Supplicant in the case of EAP-SIM);
Kc—a 64-bit ciphering key, used to encipher and decipher data transmitted between the Supplicant and the Authenticator—

In step 9, the Authentication Server 3 generates a RADIUS Access Challenge/EAP-Request/SIM/Challenge message, including RAND challenges and message authentication code attribute (AT_MAC), and forwards to the Authenticator, wherein the AT_MAC derivation is based on the RAND and Kc values. In step 10, the Authenticator forwards the EAP-Request/SIM/Challenge message to the Supplicant. In step 11, the Supplicant feeds the received RAND into the GSM algorithms running on the SIM, and the output is a copy of the AT_MAC and a SRES value. The Supplicant verifies the generated AT_MAC by checking whether the AT_MAC value received from the Authentication Server matches the one generated by the SIM. If so, the Supplicant continues with the authentication. Otherwise the Supplicant responds with an EAP-Response/SIM/Client- Error message, and derives a new AT_MAC, based on the previously generated SRES. The AT_MAC is sent to the Authentication Server in an EAP-Response/SIM/Challenge message, in step 12. The Authenticator forwards a RADIUS Access Request/EAP-Response/SIM/Challenge to the Authentication Server, in step 13, and the Authentication Server verifies the new AT_MAC value that the Supplicant has just sent. If the verification is successful, it sends an RADIUS Access Accept/EAP-Success message, in step 14, which also carries keying material—Pairwise Master Key (PMK). The PMK is intended for the Authenticator only and it is not forwarded to the Supplicant, but the Supplicant can derive the same key autonomously. In step 15, the Authenticator forwards the EAP-Success message to the Supplicant and stores the PMK.

Figure 4:
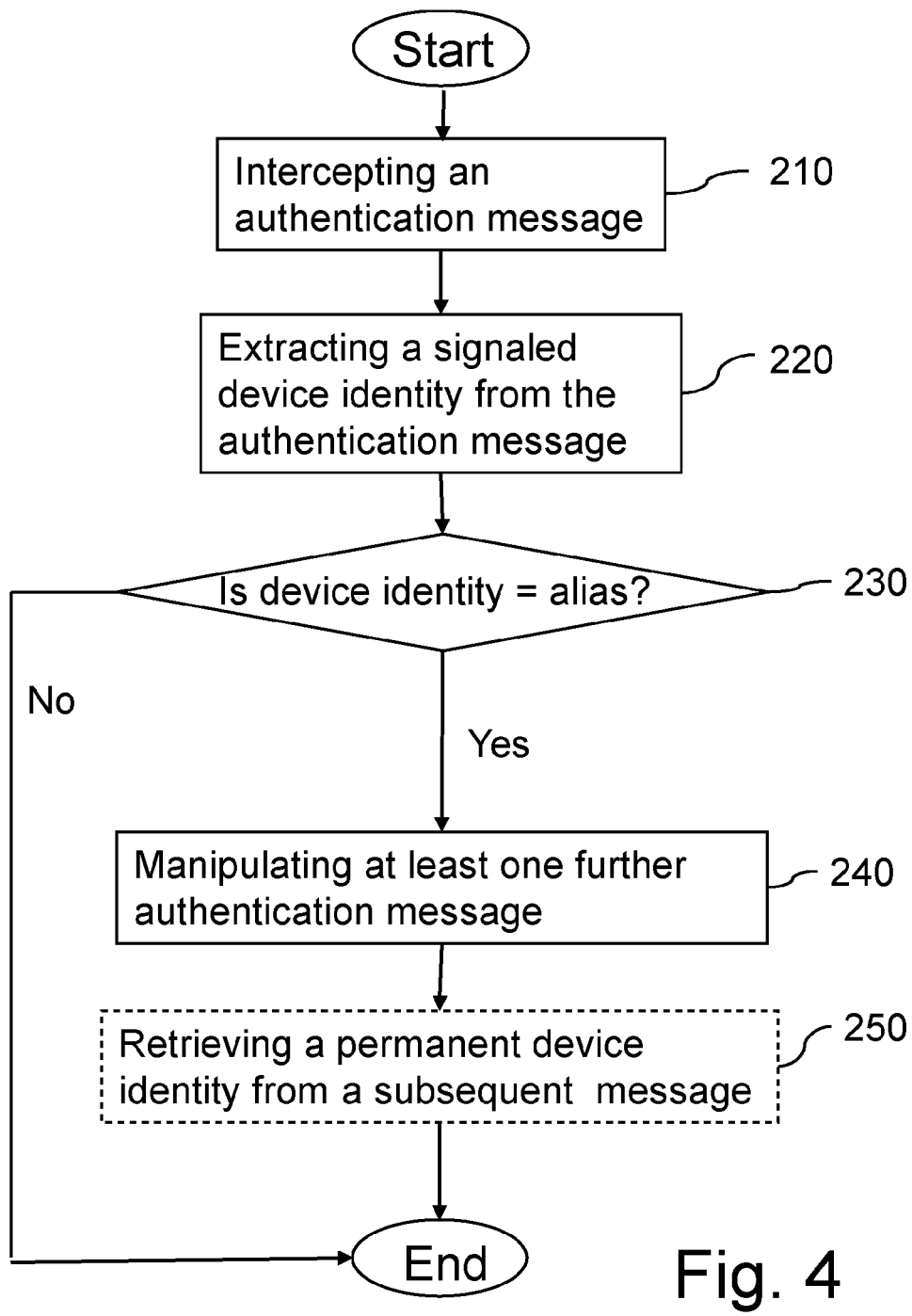
FIG. 4 is a flowchart illustrating a method according to embodiments.

A concept of embodiments of the present invention is illustrated in FIG. 4, which is a flow chart illustrating a method for a network node of obtaining a permanent device identity of a wireless device requesting authentication at the network node.

The method comprises the network node/Authenticator/Wi-Fi Access Point 2 intercepting, in step 210, an authentication message from the wireless device 1, and extracting, in step 220, a signaled identity from the intercepted authentication message. In step 230, the network node 2 determines if the extracted signaled identity is an alias. If, and when, the device identity is an alias, the network node manipulates, in step 240, at least one further authentication message to cause the wireless device to signal its permanent device identity in a subsequent authentication message.

The above-mentioned alias may represent any type of non-permanent identity associated with a wireless device during an authentication procedure, e.g. a pseudonym identity or a fast re-authentication identity. A permanent device identity may contain an International Mobile Subscriber Identity, IMSI, or any other type of identifier that uniquely or unambiguously identifies a wireless device.

A check of the format of the signaled identity is perceived as a means to determine, in step 230, if the wireless device has provided its permanent identity. However, the method is not limited to this check and other means of determining the signaling of an alias identity is also within the scope of the disclosure.

As illustrated in FIG. 4, the method may also comprise a step of retrieving 250 the permanent device identity, e.g. from the subsequent authentication message from the wireless device, for instance an Extensible Authentication Protocol, EAP, response message.

However, the above-mentioned manipulating of at least one further authentication message, as performed in step 240 by the network node, in order to cause the wireless device to signal its permanent device identity in a subsequent authentication message, may be performed according to three alternative methods, which are illustrated in the three signaling diagrams 5a, 5b and 5c.

Figure 5A:
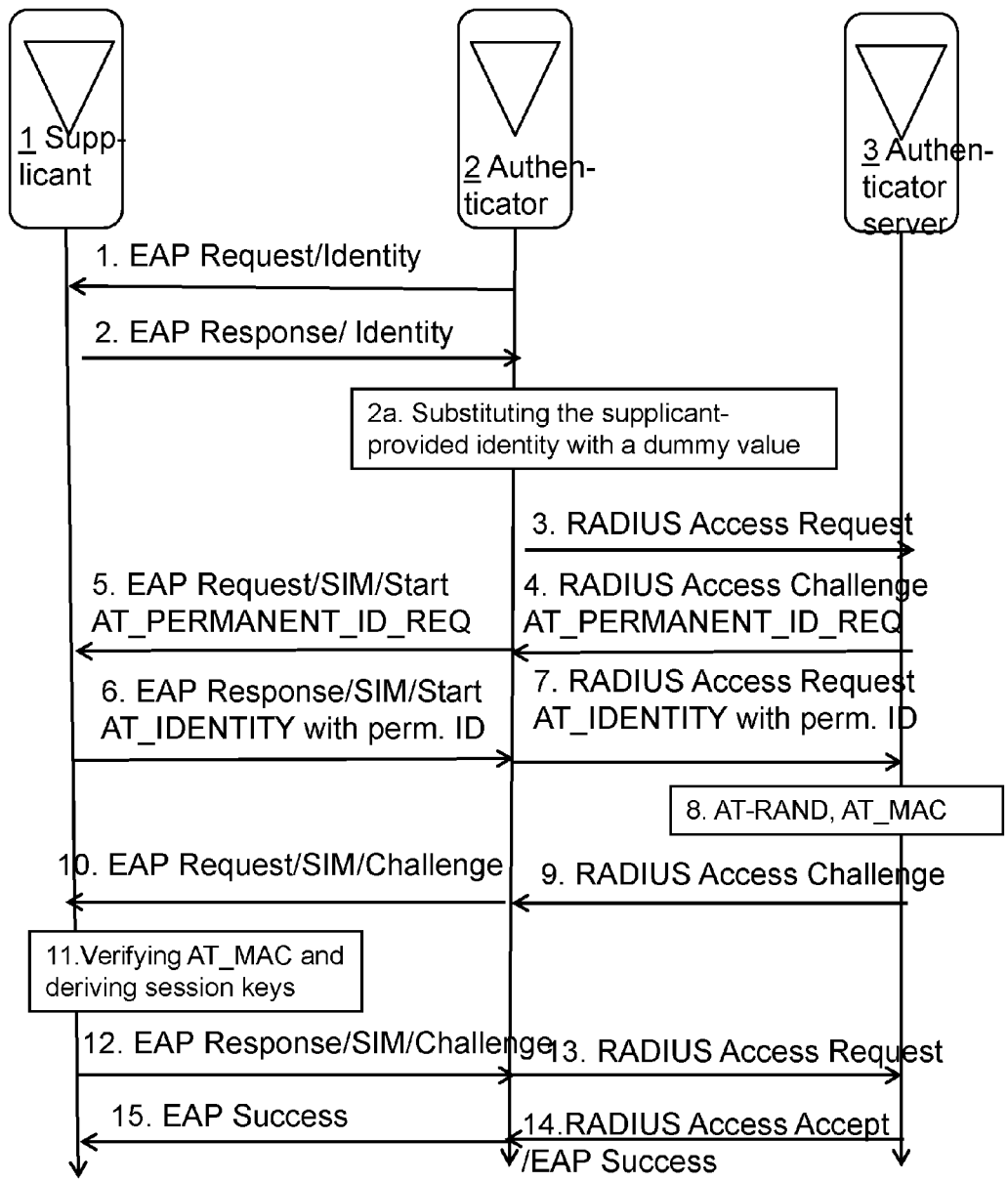
FIGS. 5a-5c are signaling diagrams illustrating three alternative embodiments of the invention, and FIGS. 6a and 6b schematically illustrate different aspects of a network node for performing a method according to embodiments.

FIG. 5a is a signaling diagram disclosing a first embodiment of the disclosure wherein the step 240 of manipulating at least one further authentication message comprises the network node 2 replacing the alias with a dummy identity in the intercepted authentication message, and providing an amended authentication message. The amended authentication message is forwarded to an authentication server 3. The replacement with the dummy identity may be performed in a functional module F1 (not illustrated in this figure) placed at the network node/Authenticator 2. Thus, upon receipt of the EAP-Response/Identity from the Supplicant, in step 2 of the signaling procedure, the network node 2 (i.e. the Authenticator) detects whether the wireless device has provided its permanent identity. In one example, the network node checks the format of the signaled identity from the wireless device to detect if the identity is its permanent identity. In the case the permanent identity is detected, the network node 2 simply forwards the RADIUS Access Request/EAP Response/Identity message as defined in the conventional EAP-SIM procedure illustrated in FIG. 3. However, in case the Supplicant uses an alias, e.g. a pseudonym or fast re-authentication identity instead, the network node 2 intercepts the EAP-Response/Identity message and substitutes the signaled identity string with a "dummy" string before forwarding the RADIUS Access Request/EAP Response/Identity message, in step 2A of the signaling procedure shown in FIG. 5a. In this way, the Authentication Server is prevented from being able to map the pseudonym (or fast re-authentication) identity to the permanent identity for that user, and will in turn request for the user's permanent identity in the following RADIUS Access Challenge/EAP Request/SIM/Start message, in step 4, by inserting the AT_PERMANENT_ID_REQ attribute, which is forwarded to the Supplicant by the Authenticator, in step 5. The Authenticator waits until the Supplicant finally sends its permanent identity, in step 6, which is forwarded to the Authentication server 3, in step 7. The remaining steps 8-15 correspond to steps with this numbering in FIG. 3, according to the standard EAP-SIM procedure.

Further regarding this first embodiment, the step of retrieving 250 the permanent device identity from the subsequent authentication message may comprise the network node receiving a request from the authentication server, e.g. a EAP-Request/SIM/Start message, to inquire the wireless device for the permanent device identity, and forwards a request for the permanent device identity to the wireless device, which implies a relaying of the EAP-Request/SIM/Start message from the network node to the wireless device.

Figure 5B:
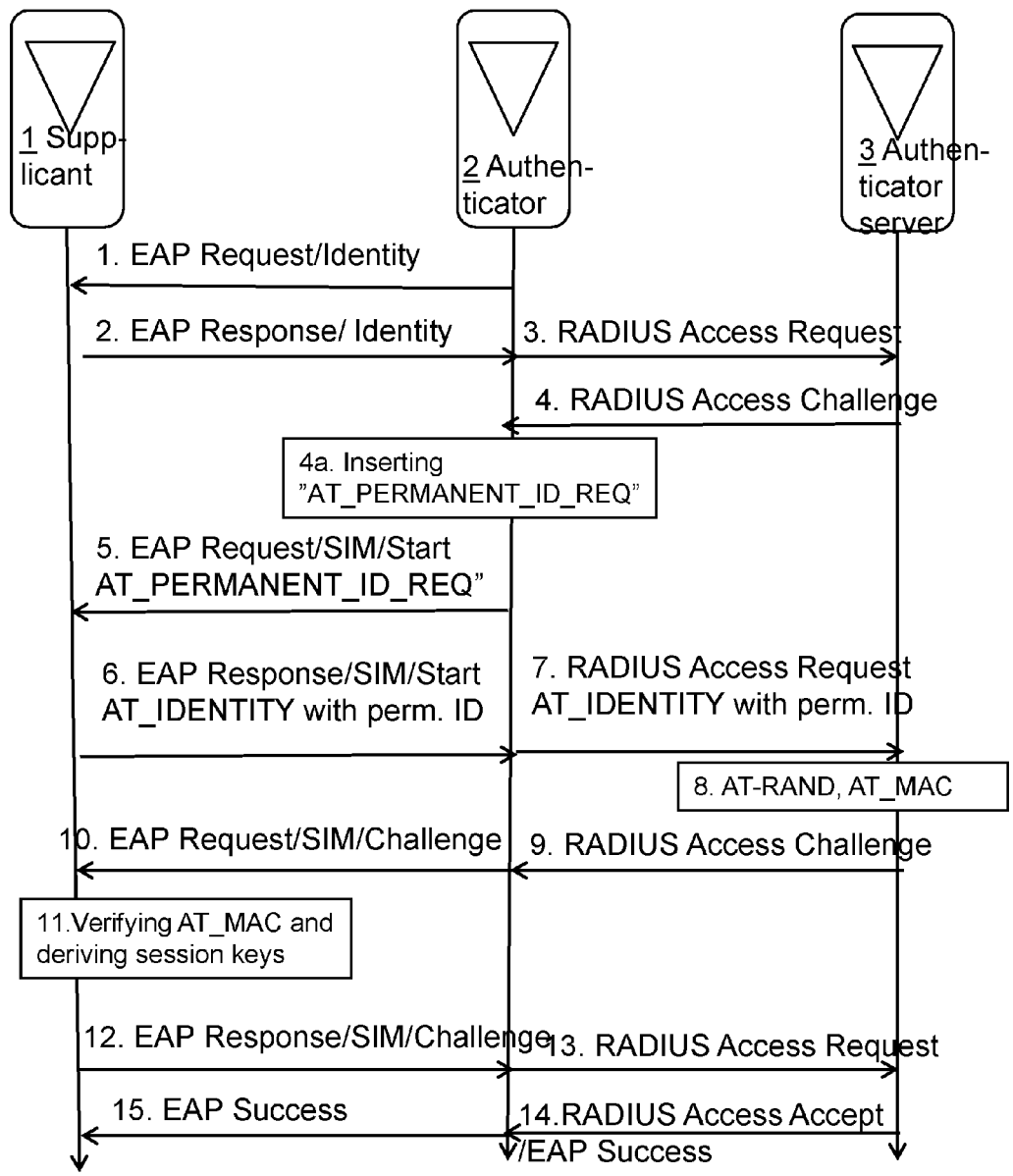

FIG. 5b is a signaling diagram illustrating a second embodiment wherein the step of manipulating at least one further authentication message comprises including an attribute in the further authentication message requesting the wireless device to submit a permanent device identity in a subsequent authentication message. As previously explained, the supplicant corresponds to the wireless device and the Authenticator to the network node. FIG. 5b discloses a second embodiment, wherein a functional module F2 (not illustrated in this figure), may be placed in the Authenticator, and it comprises a method which intercepts EAP-SIM messages and upon receiving the EAP-Response/Identity from the Supplicant, in step 2 of the signaling procedure shown in FIG. 5b, the Authenticator detects whether the Supplicant has provided its permanent identity. In the case the permanent identity is detected, the network node simply forwards the RADIUS Access Request/EAP Response/Identity message according to the normal EAP-SIM procedure, as illustrated in FIG. 3.

However, in case the Supplicant uses an alias, e.g. a pseudonym or fast re-authentication identity instead, the network node 2 intercepts the RADIUS Access Challenge/EAP Request/SIM/Start message received from the Authentication server 3 in step 4 of the signaling procedure, and checks whether the EAP message is carrying the AT_PERMANENT_ID_REQ attribute. If that is not the case, the network node inserts the AT_PERMANENT_ID_REQ attribute in the EAP/SIM/Start message, in step 4-A of the signaling procedure, before forwarding it to the Supplicant, in step 5. In that way, the Supplicant is requested to provide its permanent identity in the following EAP/SIM/Start message. The Authenticator waits until the Supplicant sends its permanent identity, in step 6, which is forwarded to the Authentication server 3, in step 7. The remaining steps 8-15 correspond to steps with this numbering in FIG. 3, according to the standard EAP-SIM procedure.

Further regarding this second embodiment, the step of retrieving 250 the permanent device identity from the subsequent authentication message comprises the network node receiving an EAP-Response/SIM/Start message from the wireless device, retrieves a permanent device identity from the message, and forwards the message to the authentication server encapsulated in a Radius message or in a DIAMETER message.

Figure 5C:
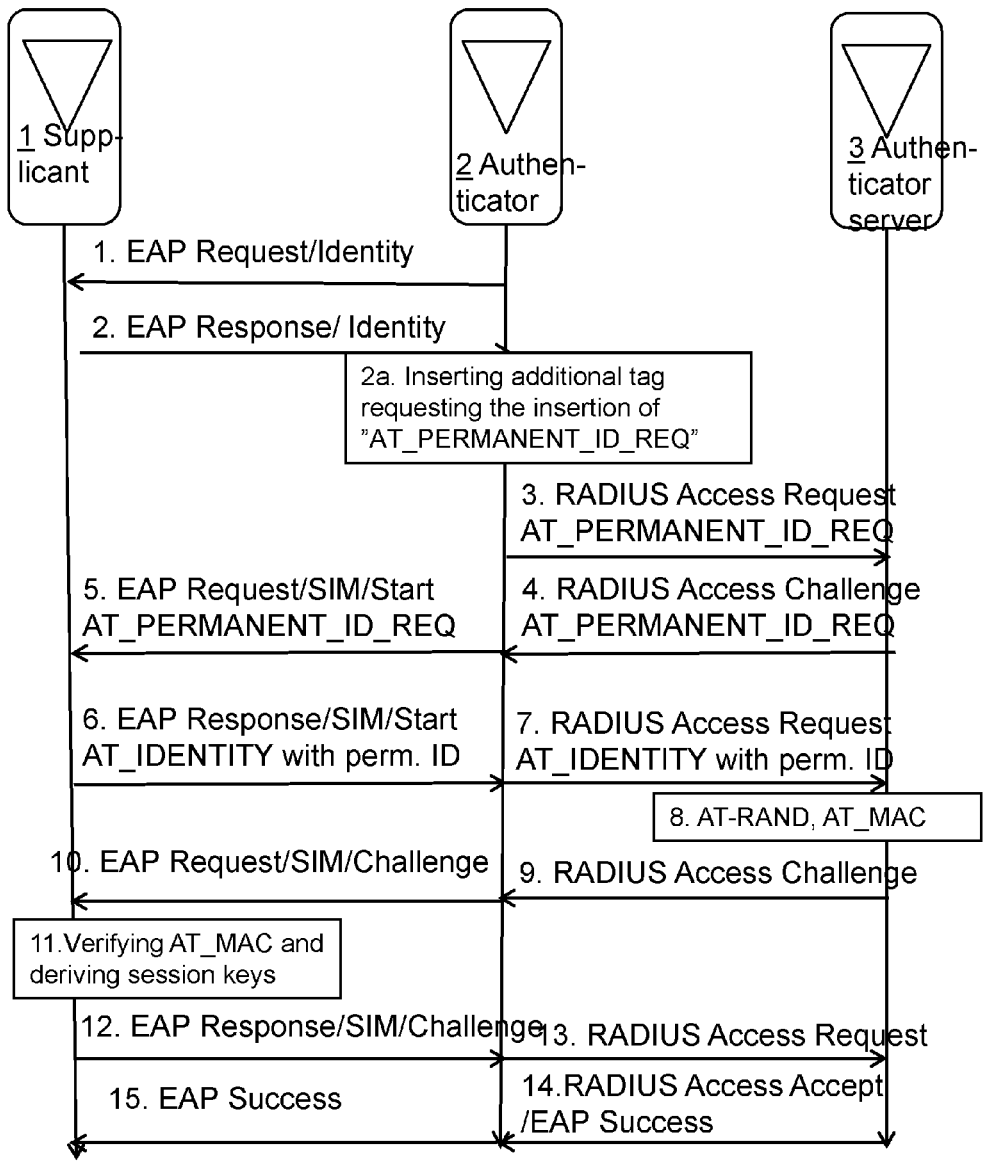

FIG. 5c illustrates a third embodiment, wherein the step 240 of manipulating at least one further authentication message comprises the network node/Authenticator/Wi-Fi AP, upon receiving the EAP-Response/Identity from the Supplicant, in step 2 of the signaling procedure, detects whether the Supplicant has provided its permanent identity. In case the Supplicant uses a pseudonym or fast re-authentication identity instead of its permanent identity, the Authenticator inserts, in step 2a, an attribute (or tag) in the RADIUS Access Request/EAP Response/Identity message, stating that the Authenticator wishes that the Authentication Server request the Supplicant's permanent identity, and the amended authentication message is forwarded to the authentication server, in step 3. In turn, the Authentication Server will interpret the tag and insert the AT_PERMANENT_ID_REQ attribute in the RADIUS Access Challenge/EAP Request/SIM/Start message, in step 4, which is forwarded to the Supplicant in the following EAP/SIM/Start message, in step 5. The Authenticator waits until the Supplicant sends its permanent identity, in step 6, which is forwarded to the Authentication server 3, in step 7. The remaining steps 8-15 correspond to steps with this numbering in FIG. 3, according to the standard EAP-SIM procedure.

However, even though only the RADIUS protocol is mentioned in the described embodiments, the DIAMETER protocol could also be used.

Thus, embodiments of this invention provides the Authenticator/network node/Wi-Fi Access Point with means to assure that the Supplicant/wireless device reveals its permanent identity during the authentication process, which in turn results in that the Authenticator is able to obtain the permanent identity of a wireless device during the authentication. The proposed mechanism covers the three embodiments described herein, but other embodiments are also within the scope of the invention. In the first and the second embodiments described above, no changes are required in the standardized authentication framework. However, in the third embodiment minor changes to the authentication framework are required.

Figure 6A:
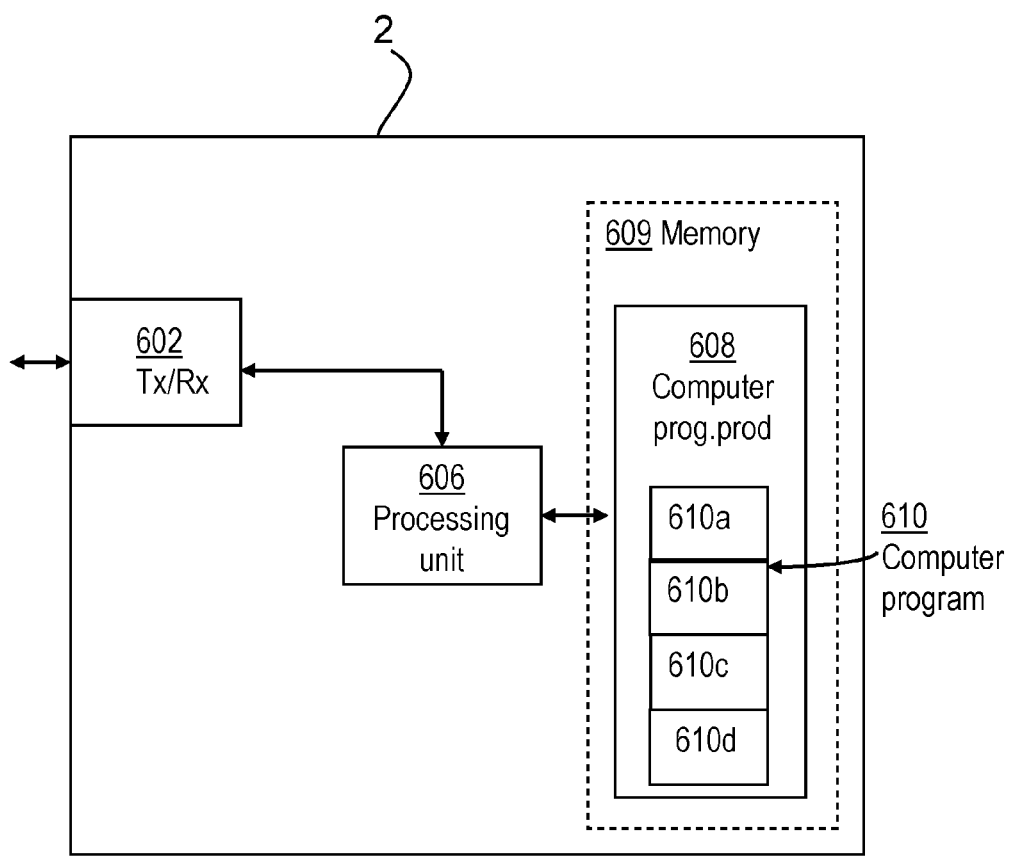
Figure 6B:
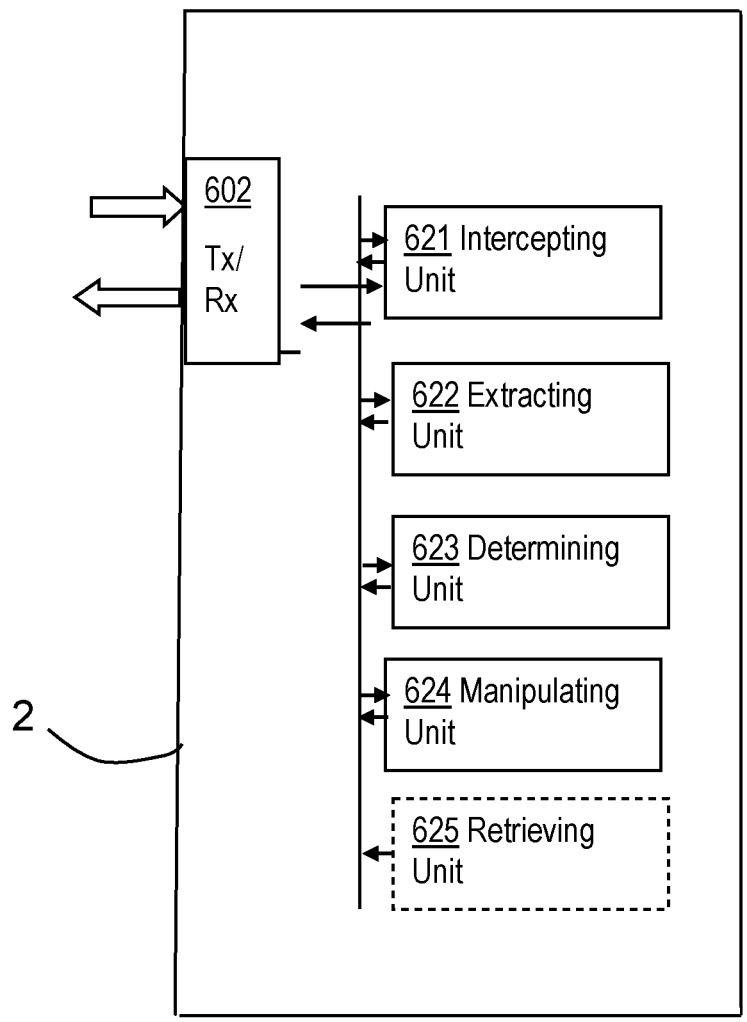

FIGS. 6a and 6b schematically illustrate exemplary embodiments of a network node/Authenticator/Wi-Fi Access Point 2.

FIG. 6a illustrates a first aspect of the network node comprising a network communication unit 602, a processing unit 606 and a memory 609. The network communication unit 602 is configured to exchange authentication data with a wireless device being authenticated, and to exchange authentication data with a back-end authentication server. The processor 606 is configured to allow/reject access for a wireless device being authenticated based on the received authentication data, and to intercept and alter authentication messages. The memory 609 is configured to store computer-readable instructions, which are configured to implement the methods described herein, when being executed by the processor 606. Furthermore, the network node 2 comprises at least one computer program product 608 stored in the memory 609, and the computer program product comprises a computer program 610 provided with coded instructions, which when executed in the processing unit 606 causes the network node 2 to perform the actions e.g. of the procedure described earlier in conjunction with FIG. 4.

The memory 609 may be in the form of a non-volatile memory, e.g. an EEPROM (Electrically Erasable Programmable Read-Only Memory), a flash memory and a hard drive. The computer program 610 may be configured as a computer program code structured in computer program modules 610a-610d. Hence, in an exemplifying embodiment, the coded instructions in the computer program of the network node comprise an interception module 610a configured to intercept an authentication message from a wireless device, wherein the authentication message comprises a signaled identity of the wireless device, an extracting module 610b configured to extract the signaled identity from the authentication message, a determining module 610c configured to determine if the signaled identity is an alias, and a manipulating module 610d configured to manipulate at least one further authentication message to cause signaling of a permanent device identity in a subsequent authentication message from the wireless device, if/when the device identity is an alias. Thus, the computer program modules could essentially perform the actions of the flow illustrated in FIG. 4 in order to emulate the network node 2.

According to a further embodiment, the computer program code, when run in the processor, causes the network node to retrieve the permanent device identity from the subsequent authentication message.

The network node may correspond to an Authenticator-entity according to the Extensible Authentication Protocol, EAP, and the subsequent authentication message may be an Extensible Authentication Protocol, EAP, response message from the wireless device. Further, the determining if the signaled identity is an alias may comprise checking a format of the signaled identity, and the alias may be provided by the authentication server and represent a pseudonym identity or a fast re-authentication identity. The permanent device identity may contain an International Mobile Subscriber Identity, IMSI.

According to a first alternative embodiment of the manipulating, the computer program code, when run in the processor, causes the manipulating of the least one further authentication message to provide an amended authentication message by replacing the alias with a dummy identity, and forward the amended authentication message to an authentication server. Further, the retrieving of the permanent device identity from the subsequent authentication message comprises receiving a request from the authentication server to inquire the wireless device for the permanent device identity, and forwarding a request for the permanent device identity to the wireless device.

The request for the permanent device identity may comprise the use of an AT_PERMANENT_ID_REQ-attribute, and the request for the permanent device identity may be included in an EAP-Request/SIM/Start message during an authentication procedure. Further, the EAP-Request/SIM/Start message may be received from the Authentication server, and the sending of the request for the permanent device identity to the wireless device may imply relaying the EAP-Request/SIM/Start message from the network node to the wireless device.

According to a second alternative embodiment of the manipulating, the computer program code, when run in the processor, causes the manipulating of the least one further authentication message to include an attribute in the further authentication message requesting the wireless device to submit a permanent device identity in the subsequent authentication message. Further, the retrieving of the permanent device identity from the further authentication message comprises the network node receiving an EAP/Response/SIM/Start message from the wireless device, retrieving a permanent device identity, and forwarding the EAP/Response/SIM/Start message encapsulated in a RADIUS message and/or in a DIAMETER message to the authentication server. The attribute may be an AT_PERMANENT_ID_REQ-attribute, According to a third alternative embodiment of the manipulating, the computer program code, when run in the processor, causes the manipulating of the least one further authentication message to provide an amended authentication message by inserting a request for a permanent device identity in the intercepted authentication message, to forward the amended authentication message to an authentication server, to receive a request from the authentication server to inquire the wireless device for the permanent device identity, and to send a request for the permanent device identity to the wireless device. Further, the amended authentication message may comprise a request for insertion of an AT-PERMANENT_ID_REQ-attribute in a subsequent authentication message.

However, even though the coded instructions in the embodiments disclosed above in conjunction with FIG. 6a are implemented as computer program modules which when executed in the respective processing unit causes the network node to perform the actions described above in the conjunction with figures mentioned above, at least one of the modules may in alternative embodiments be implemented at least partly as hardware circuits.

FIG. 6b illustrates another aspect of the network node/Authenticator/Wi-Fi AP 2, showing the network communication unit 602, and an intercepting unit 621 for intercepting an authentication message from a wireless device, an extracting unit 622 for extracting a signalled identity from the authentication message, and a determining unit 623 for determining if the signalled identity is an alias. The network node further comprises a manipulating unit 624 for manipulating at least one further authentication message, when the device identity is an alias, to cause signalling of a permanent device identity in a subsequent authentication message from the wireless device. Optionally, the network node comprises a retrieving unit 625 for retrieving the permanent identity of the wireless device from the subsequent authentication message. Thus, the method performed by the units in FIG. 6b corresponds to the methods executed in the computer program modules in FIG. 6a. However, it is apparent that at least one of the above-described units may be implemented at least partly as hardware circuits.

The processor 606 may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a network node for obtaining a permanent device identity of a wireless device requesting authentication at said network node, the method comprising:
   intercepting an authentication message from a wireless device, wherein the authentication message comprises a signaled identity of the wireless device,
   extracting the signaled identity from the authentication message,
   determining if the signaled identity is an alias, and
   responsive to determining that the device identity is an alias, manipulating at least one further authentication message to cause signaling of a permanent device identity in a subsequent authentication message from the wireless device, wherein the step of manipulating at least one further authentication message comprises:
   providing an amended authentication message by replacing the alias with a dummy identity,
   forwarding the amended authentication message to an authentication server,
   receiving a request from the authentication server to inquire the wireless device for the permanent device identity, and
   sending a request for the permanent device identity to the wireless device.

2. The method according to claim 1, wherein the network node corresponds to an Authenticator-entity according to the Extensible Authentication Protocol, EAP.

3. The method according to claim 1, the method further comprising retrieving the permanent device identity from the subsequent authentication message.

4. The method according to claim 1, wherein the subsequent authentication message is an Extensible Authentication Protocol, EAP, response message from the wireless device.

5. The method according to claim 1, wherein the step of determining if the signaled identity is an alias comprises checking a format of the signaled identity.

6. The method according to claim 1, wherein the alias is provided by the authentication server and represents a pseudonym identity or a fast re-authentication identity.

7. The method according to claim 1, wherein the permanent device identity contains an International Mobile Subscriber Identity, IMSI.

8. The method according to claim 1, wherein the request for the permanent device identity comprises the use of an AT_PERMANENT_ID_REQ-attribute.

9. The method according to claim 1, wherein the request for the permanent device identity is included in an EAP-Request/SIM/Start message in an authentication procedure.

10. The method according to claim 9, wherein the EAP-Request/SIM/Start message is received from the Authentication server, and wherein the step of sending the request for the permanent device identity to the wireless device comprises relaying the EAP-Request/SIM/Start message from the network node to the wireless device.

11. The method according to claim 1, wherein the step of manipulating at least one further authentication message further comprises:
  including an attribute in the further authentication message requesting the wireless device to submit a permanent device identity in the subsequent authentication message.

12. The method according to claim 11, wherein the attribute is an AT_PERMANENT_ID_REQ-attribute.

13. The method according to claim 11, wherein the further authentication message is an EAP-Request/SIM/Start message encapsulated in a RADIUS message and/or in a DIAMETER message.

14. The method according to claim 11, further comprising retrieving the permanent device identity from the subsequent EAP response message comprises:
  receiving an EAP/Response/SIM/Start message from the wireless device,
  retrieving a permanent device identity, and
  forwarding the EAP/Response/SIM/Start message, encapsulated in a RADIUS message and/or in a DIAMETER message, to the authentication server.

15. A network node configured to obtain a permanent device identity of a wireless device requesting authentication at said network node, the network node comprising:
  a processor; and
  a memory storing a computer program comprising computer program code which, when run in the processor, causes the network node to:
    intercept an authentication message from a wireless device, wherein the authentication message comprises a signaled identity of the wireless device;
    extract the signaled identity from the authentication message; and
    determine if the signaled identity is an alias, and, responsive to determining that the device identity is an alias, manipulate at least one further authentication message to cause signaling of a permanent device identity in a subsequent authentication message from the wireless device, wherein the manipulating at least one further authentication message comprises:
      providing an amended authentication message by replacing the alias with a dummy identity,
      forwarding the amended authentication message to an authentication server,
      receiving a request from the authentication server to inquire the wireless device for the permanent device identity, and
      sending a request for the permanent device identity to the wireless device.

16. The network node according to claim 15, wherein the network node corresponds to an Authenticator-entity according to the Extensible Authentication Protocol, EAP.

17. The network node according to claim 15, wherein the computer program code, when run in the processor, causes the network node to retrieve the permanent device identity from the subsequent authentication message.

18. The network node according to claim 17, wherein the subsequent authentication message is an Extensible Authentication Protocol, EAP, response message from the wireless device.

19. The network node according to claim 15, wherein the determining if the signaled identity is an alias comprises checking a format of the signaled identity.

20. The network node according to claim 15, wherein the alias is provided by the authentication server and represents a pseudonym identity or a fast re-authentication identity.

21. The network node according to claim 15, wherein the permanent device identity contains an International Mobile Subscriber Identity, IMSI.

22. The network node according to claim 15, wherein the request for the permanent device identity comprises the use of an AT_PERMANENT_ID_REQ-attribute.

23. The network node according to claim 15, wherein the request for the permanent device identity is included in an EAP-Request/SIM/Start message in an authentication procedure.

24. The network node according to claim 23, wherein the EAP-Request/SIM/Start message is received from the Authentication server, and wherein the sending of the request for the permanent device identity to the wireless device comprises relaying the EAP-Request/SIM/Start message from the network node to the wireless device.

25. The network node according to claim 15, wherein the computer program code, when run in the processor, causes the manipulating of the least one further authentication message to further comprise:
  including an attribute in the further authentication message requesting the wireless device to submit a permanent device identity in the subsequent authentication message.

26. The network node according to claim 25, wherein the attribute is an AT_PERMANENT_ID_REQ-attribute.

27. The network node according to claim 25, wherein the further authentication message is an EAP-Request/SIM/Start message encapsulated in a RADIUS message and/or in a DIAMETER message.

28. The network node according to claim 27, wherein the computer program code, when run in the processor, causes the retrieving of the permanent device identity from the subsequent EAP response message to comprise:
  receiving an EAP/Response/SIM/Start message from the wireless device,
  retrieving a permanent device identity, and
  forwarding the EAP/Response/SIM/Start message encapsulated in a RADIUS message and/or in a DIAMETER message to the authentication server.

29. A network node configured to obtain a permanent device identity of a wireless device requesting authentication at said network node, the network node comprising:
  an intercepting circuit for intercepting an authentication message from a wireless device, wherein the authentication message comprises a signaled identity of the wireless device;
  an extracting circuit for extracting the signaled identity from the authentication message;
  a determining circuit for determining if the signaled identity is an alias; and
  a manipulation circuit for, responsive to determining that the device identity is an alias, manipulating at least one further authentication message to cause signaling of a permanent device identity in a subsequent authentication message from the wireless device,
  wherein the manipulating at least one further authentication message comprises:
    providing an amended authentication message by replacing the alias with a dummy identity,
    forwarding the amended authentication message to an authentication server, receiving a request from the authentication server to inquire the wireless device for the permanent device identity, and sending a request for the permanent device identity to the wireless device.

30. The network node according to claim 29, further comprising a retrieving circuit for retrieving the permanent device identity from the subsequent authentication message.

\* \* \* \* \*